Patented July 22, 1924.

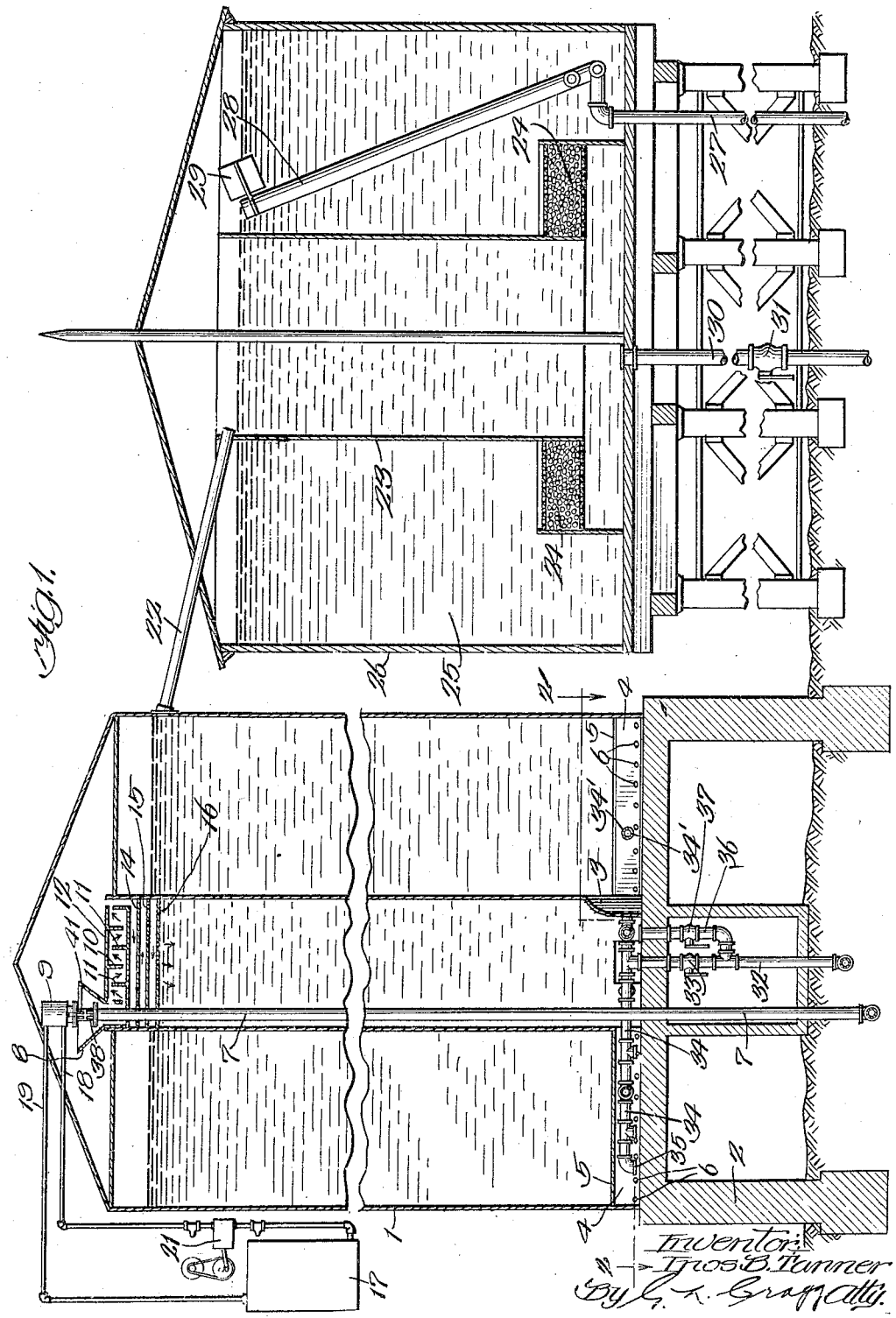

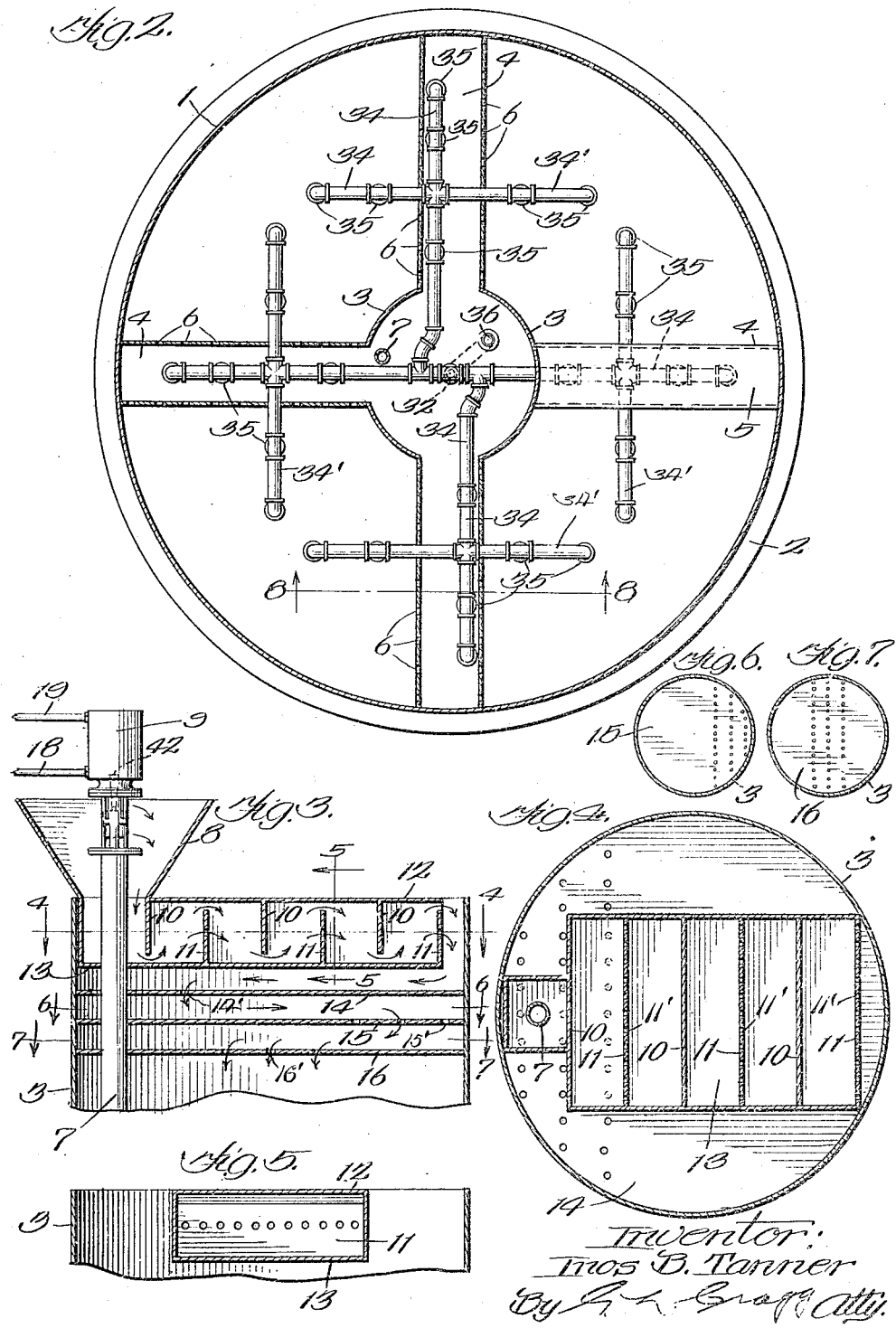

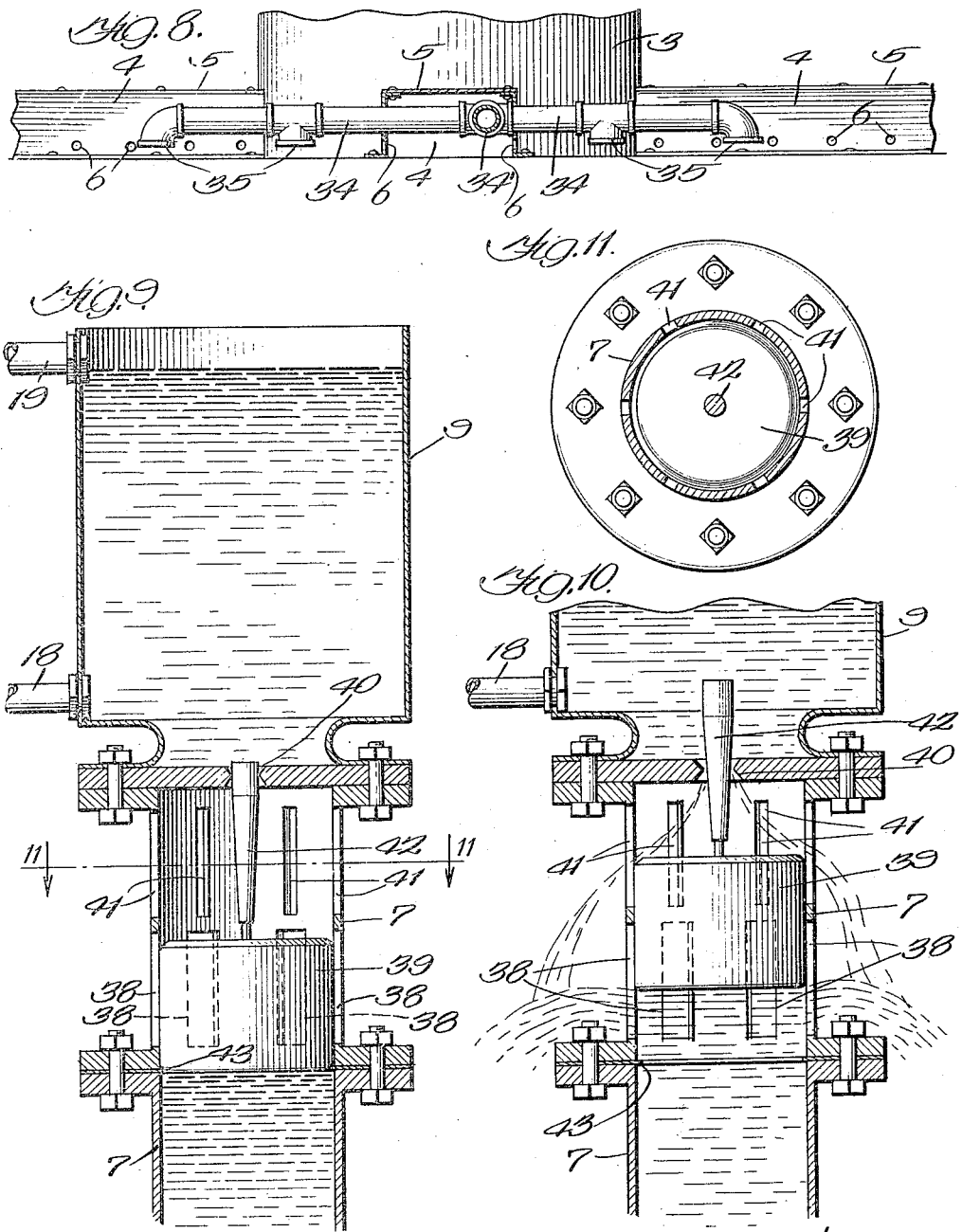

1,502,448

UNITED STATES PATENT OFFICE.

INOS B. TANNER, OF CHICAGO, ILLINOIS, ASSIGNOR TO JOS. E. NELSON & SONS, OF CHICAGO, ILLINOIS, A COPARTNERSHIP.

LIQUID-TREATING APPARATUS.

Application filed July 23, 1921. Serial No. 487,121.

*To all whom it may concern:*

Be it known that I, INOS B. TANNER, citizen of the United States, residing at Chicago, in the county of Cook and State of Illinois, have invented a certain new and useful Improvement in Liquid-Treating Apparatus, of which the following is a full, clear, concise, and exact description.

My invention relates to liquid treating apparatus and is of particular service in the softening of water to prepare it for industrial use.

My invention has for one object the provision of improved means for maintaining a selected proportion between the water and chemical flowing into a settling chamber at varying rate. The invention has other objects as will appear.

In carrying out my invention I employ a settling chamber, a chemical tank discharging into the settling chamber, a source of liquid under pressure, a pipe through which the liquid passes into the settling chamber for treatment, a valve in the liquid pipe and controlling parts in said pipe, and, preferably, a valve in the chemical chamber and given opening and closing movements by the other valve when the latter is given opening and closing movements, the arrangement being such that the varying volumes of water and chemical will be in fixed proportion to secure the required reaction between the chemical and the materials that are to be precipitated out of the liquid. Water may readily be softened by means of such an equipment having the characteristics of my invention.

I will explain my invention more fully by reference to the accompanying drawings showing the preferred embodiment thereof as employed in water softening equipment and in which Fig. 1 is a view illustrating a water softening plant, parts being shown in sectional elevation and a portion of the figure being diagrammatic; Fig. 2 is a sectional view on line 2—2 of Fig. 1; Fig. 3 is a view on a larger scale of a part of the equipment at the upper end of the settling chamber shown in Fig. 1; Figs. 4, 5, 6 and 7 are sectional views respectively taken on lines 4—4, 5—5, 6—6 and 7—7 of Fig. 3; Fig. 8 is a sectional view on line 8—8 of Fig. 1; Fig. 9 is a vertical sectional view through the chemical tank and the upper portion of the pipe through which the liquid to be treated is passed into the settling chamber, the chemical tank being supported upon this pipe as a matter of convenience; Fig. 10 is a sectional view illustrating a part of the structure shown in Fig. 9 with parts in changed positions; and Fig. 11 is a sectional view on line 11—11 of Fig. 9.

Like parts are indicated by similar characters of reference throughout the different figures.

The equipment will first be generally described whereafter the features thereof constituting my invention will be more particularly set forth.

The tank 1 is of any suitable formation and is supported in any suitable manner, as upon a foundation 2. It is provided with a central settling chamber 3, which may be in the form of a stand pipe resting upon the foundation. This chamber has no communication with the tank space surrounding it, except through the passages 4 which are formed in and beneath the tank bottom 5, the side walls of these passages being perforated as indicated at 6 to permit treated water that descends through the settling chamber to pass into the surrounding chamber that thus constitutes a treated water chamber.

The water to be treated is supplied from the city mains or from any other suitable source and flows through the riser 7 that may pass upwardly through the settling chamber to the place where the raw water is to be discharged into such chamber. This chamber is provided with a continuation in the form of a funnel 8 at the upper end of the chamber.

As will be more fully hereinafter set forth, the water passing from the pipe 7 into the settling chamber 3 controls the flow of chemical from the chemical tank 9 into the funnel 8 so that the chemical will flow in quantity proportional to the amount of raw water discharged into said funnel. The mixture of water and chemical is initiated in the funnel and is promoted by the upright perforated interleaved baffle plates 10, 11 carried by the horizontal imperforate passage walls 12, 13, and the horizontal perforated baffle plates 14, 15, 16 that extend in all directions to the pipe 3 that supports them.

Parts of the water and chemical find their way through the perforations 11' in the baffle plates 11 and the balance of the water and chemical follow the zigzag course defined by these baffle plates, the perforations being sufficiently restricted in number and size as to cause this latter result. The chemical and water find entry to the pipe 3 near one side of the pipe, the horizontal baffle 14 having perforations 14' at the other side of the pipe so that the down flowing water and chemical are forced to pass to the other side of the pipe in order to pass to the succeeding baffle 15 whose perforations 15' are diametrically opposite the perforations 14' for a similar reason. The perforations 16' in the baffle 16 may be disposed across the mid-portion thereof. By means of the perforated baffles, the chemical and water are thoroughly intermixed before finding passage into the part of the settling chamber 3 below them, where the chemical has full opportunity to react upon substances in the water that are to be precipitated and removed to soften the water.

The chemical is supplied to the chemical tank from a chemical supply tank 17 which discharges into the chemical tank through the supply pipe 18, and which supply tank receives unemployed chemical back from the chemical tank through the return pipe 19. The chemical is preferably maintained at a fixed level within the chemical tank 9 by terminating the return pipe 19 at the selected level.

A pump 21 may be inserted in the pipe 18 to force the flow of the chemical. The softened water finds passage through the perforations 6 in the side walls of the passages 4 and into the softened water chamber in the tank 1 that surrounds the settling chamber 3. An outlet pipe 22 connects the top portion of the softened water chamber with the top end of the upright chamber 23. This chamber discharges, at its lower end, into the space beneath the filters 24 through which the softened water passes into the soft water supply chamber 25. This chamber 25 is formed between the chamber 23 and the tank 26 in which the chamber 23 and the filter 24 are disposed. The filtered water is discharged from the tank 25 through a discharge pipe 27 having a swinging section 28 whose receiving end is held at the upper level of the filtered softened water by means of a float 29 attached to the upper end of this swinging pipe section.

The impurities intercepted by the filter from the softened water flowing therethrough may be discharged through the discharge pipe 30 when the valve 31 in this pipe is opened to permit the water from chamber 23 to flow downwardly very rapidly to wash away the collected impurities. Water in chamber 25 then also passes backwardly through the filter to cleanse it.

The sludge or precipitate resulting from the water softening process may be discharged through the pipe 32 when the valve 33 therein is opened. This discharge pipe has receiving branches 34 in the passages 4 and branches 34' extending into the chamber 25. These receiving branches are each provided with a number of receiving mouths 35 distributed along the same. The pipe 32 has another branch 36 terminating within and at the bottom of the settling chamber 3, this branch pipe being connected with pipe 32 below valve 33. A valve 37 is in the branch 36. When it is desired to discharge the water without effecting material removal of the sludge, valve 37 is alone opened. When the sludge is to be removed both valves may be opened, or valve 33 may alone be opened.

The pipe 7 is formed with ports 38 that are elongated lengthwise of the pipe. The water to be treated passes through these ports into the settling chamber. A valve 39 is made heavy or weighted sufficiently to counteract the pressure thereon of the water passing through the pipe 7 toward the ports 38. The chemical tank 9 is preferably carried upon the top end of pipe 7 and has a port 40 in its bottom that discharges into the extreme upper end of pipe 7 from which the chemical flows into the settling chamber through the ports 41. A downwardly tapered valve 42 operates in the port 41 and is controlled by and is preferably connected with the valve 39 above which it is desirably disposed.

When there is no water flowing the valve 39 is seated upon its seat 43. When the water is under sufficient pressure to flow, the valve 39 will open the water ports 38, the chemical port 40 being simultaneously opened by the lifted valve 42 whose top portion is straight so that it will not open its port 40 in advance of the opening of the ports 38. The tapering of the valve 42 is such that the chemical and water will be in exact proportion irrespective of the volume in which they are permitted to flow into the settling chamber by their valves. It is to be understood that the chemical chamber is mounted upon the pipe 7 as a matter of convenience and that the invention is not to be thus limited. The chemical and water initially flow into the funnel 8 and from this funnel they flow around and through the baffles 10 and 11 and through the baffles 14, 15, 16 as and for the purpose hitherto set forth.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. Liquid treating apparatus including a source of liquid furnishing liquid under pressure to be treated; a pipe communicating with said source; a valve in said pipe operated by the liquid, the pipe having a port closed by said valve and also opened to varying extents by the valve according to the pressure exerted upon the valve by the liquid; a settling chamber into which the liquid to be treated is discharged through said port; a chemical tank having a port through which chemical is discharged into the settling chamber; and a valve adapted to open and close the port in the chemical tank to varying extents and actuated by the other valve, said valves and ports being interrelated to cause the proportion of the chemical and liquid supplied to the settling chamber to be substantially constant with varying rates of flow of the liquid and chemical.

2. Liquid treating apparatus including a source of liquid furnishing liquid under pressure to be treated; a pipe communicating with said source; a valve in said pipe operated by the liquid, the pipe having a port closed by said valve and also opened to varying extents by the valve according to the pressure exerted upon the valve by the liquid; a settling chamber into which the liquid to be treated is discharged through said port; a chemical tank having a port through which chemical is discharged into the settling chamber; and a tapered valve adapted to open and close the port in the chemical tank to varying extents and actuated by the other valve, said valves and ports being interrelated to cause the proportion of the chemical and liquid supplied to the settling chamber to be substantially constant with varying rates of flow of the liquid and chemical.

3. Liquid treating apparatus including a source of liquid furnishing liquid under pressure to be treated; a pipe communicating with said source; a valve in said pipe operated by the liquid, the pipe having a port closed by said valve and also opened to varying extents by the valve according to the pressure exerted upon the valve by the liquid; a settling chamber into which the liquid to be treated is discharged through said port; a chemical tank; and means controlled by the aforesaid valve for effecting the discharge of chemical from the chemical tank into the settling chamber, said valve and said means being interrelated to cause the proportion of the chemical and liquid supplied to the settling chamber to be substantially constant with varying rates of flow of the liquid and chemical.

In witness whereof, I hereunto subscribe my name this 15th day of July A. D., 1921.

INOS B. TANNER.